US012578214B2

(12) United States Patent　　　　(10) Patent No.:　US 12,578,214 B2

Kido et al.　　　　　　　　　　　　(45) Date of Patent:　　Mar. 17, 2026

(54) FLOW MEASUREMENT DEVICE

(71) Applicant: KOFLOC CORP., Kyoto (JP)

(72) Inventors: Keiji Kido, Kyoto (JP); Shunta Furukawa, Kyoto (JP); Kota Tanaka, Kyoto (JP); Tomoya Futagami, Kyoto (JP); Shusaku Ono, Kyoto (JP); Seigo Yoshida, Kyoto (JP)

(73) Assignee: KOFLOC CORP., Kyoto (JP)

( * ) Notice: Subject to any disclaimer, the term of this patent is extended or adjusted under 35 U.S.C. 154(b) by 301 days.

(21) Appl. No.: 18/027,423

(22) PCT Filed: Sep. 29, 2020

(86) PCT No.: PCT/JP2020/036832

§ 371 (c)(1),
(2) Date: Mar. 21, 2023

(87) PCT Pub. No.: WO2022/070239

PCT Pub. Date: Apr. 7, 2022

(65) Prior Publication Data

US 2024/0011806 A1　　Jan. 11, 2024

(51) Int. Cl.
*G01F 1/32*　　　　(2022.01)
(52) U.S. Cl.
CPC .................................. *G01F 1/3209* (2013.01)
(58) Field of Classification Search
CPC ......... G01F 1/32; G01F 1/3209; G01F 1/3218
See application file for complete search history.

(56) References Cited

U.S. PATENT DOCUMENTS

| 4,606,318 | A | 8/1986 | Tsuchida et al. |
| 6,658,945 | B1 * | 12/2003 | Kleven ................. G01F 1/3287 |
| | | | 73/861.22 |
| 8,874,387 | B2 | 10/2014 | Mizutani et al. |
| 11,307,076 | B2 | 4/2022 | Ohshima et al. |
| 2009/0299657 | A1 | 12/2009 | Mizutani et al. |

(Continued)

FOREIGN PATENT DOCUMENTS

| CN | 106706046 | 5/2017 |
| CN | 111141341 | 5/2020 |
| DE | 10 2011 050 716 | 12/2012 |

(Continued)

OTHER PUBLICATIONS

International Search Report (ISR) issued Nov. 10, 2020 in International (PCT) Application No. PCT/JP2020/036832.

(Continued)

*Primary Examiner* — Erika J. Villaluna

(74) *Attorney, Agent, or Firm* — Wenderoth, Lind & Ponack, L.L.P.

(57)　　　　　　ABSTRACT

A flow measurement device includes a bluff body in a flow path in a measuring pipe to generate Karman vortices downstream of the bluff body, and a temperature sensor downstream of a piezoelectric element for sensing a change in the Karman vortices by converting the change into an electrical signal. A flow rate of a fluid can be corrected based on a relation of a vortex shedding frequency at a temperature of the fluid measured with the temperature sensor and a vortex shedding frequency of the fluid measured at a reference temperature.

1 Claim, 5 Drawing Sheets

(56) References Cited

U.S. PATENT DOCUMENTS

2021/0072065 A1     3/2021   Ohshima et al.

FOREIGN PATENT DOCUMENTS

| | | |
|---|---|---|
| JP | 54-11766 | 1/1979 |
| JP | 58-208622 | 12/1983 |
| JP | 63-201528 | 8/1988 |
| JP | 7-209043 | 8/1995 |
| JP | 2000-193529 | 7/2000 |
| JP | 3964416 | 8/2007 |
| JP | 2009-288153 | 12/2009 |
| TW | I668414 | 8/2019 |

OTHER PUBLICATIONS

Taiwanese Office Action issued Dec. 6, 2011 in counterpart Taiwanese Patent Application 110113083, together with machine translation.
International Preliminary Report on Patentability dated Mar. 28, 2023 in International (PCT) Application No. PCT/JP2020/036832.

\* cited by examiner

[FIG.1]
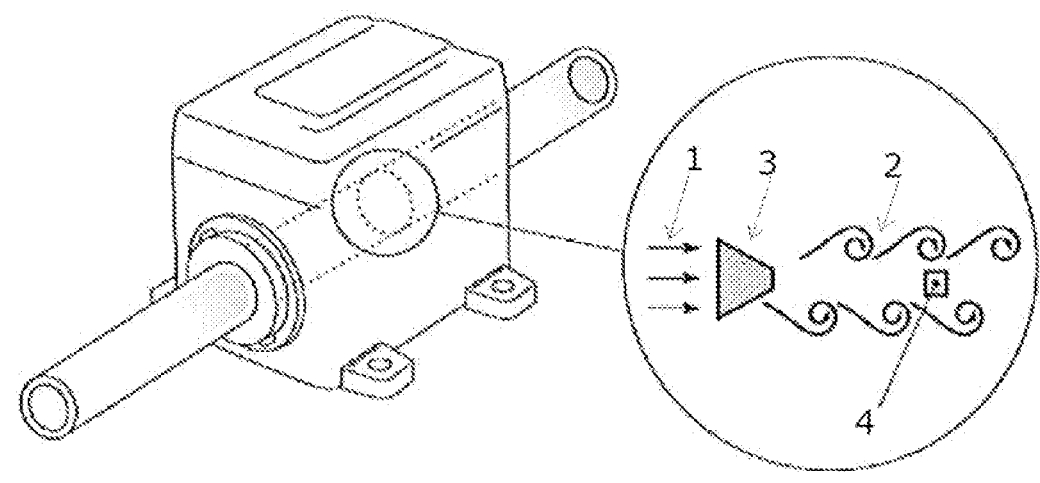

[FIG.2]
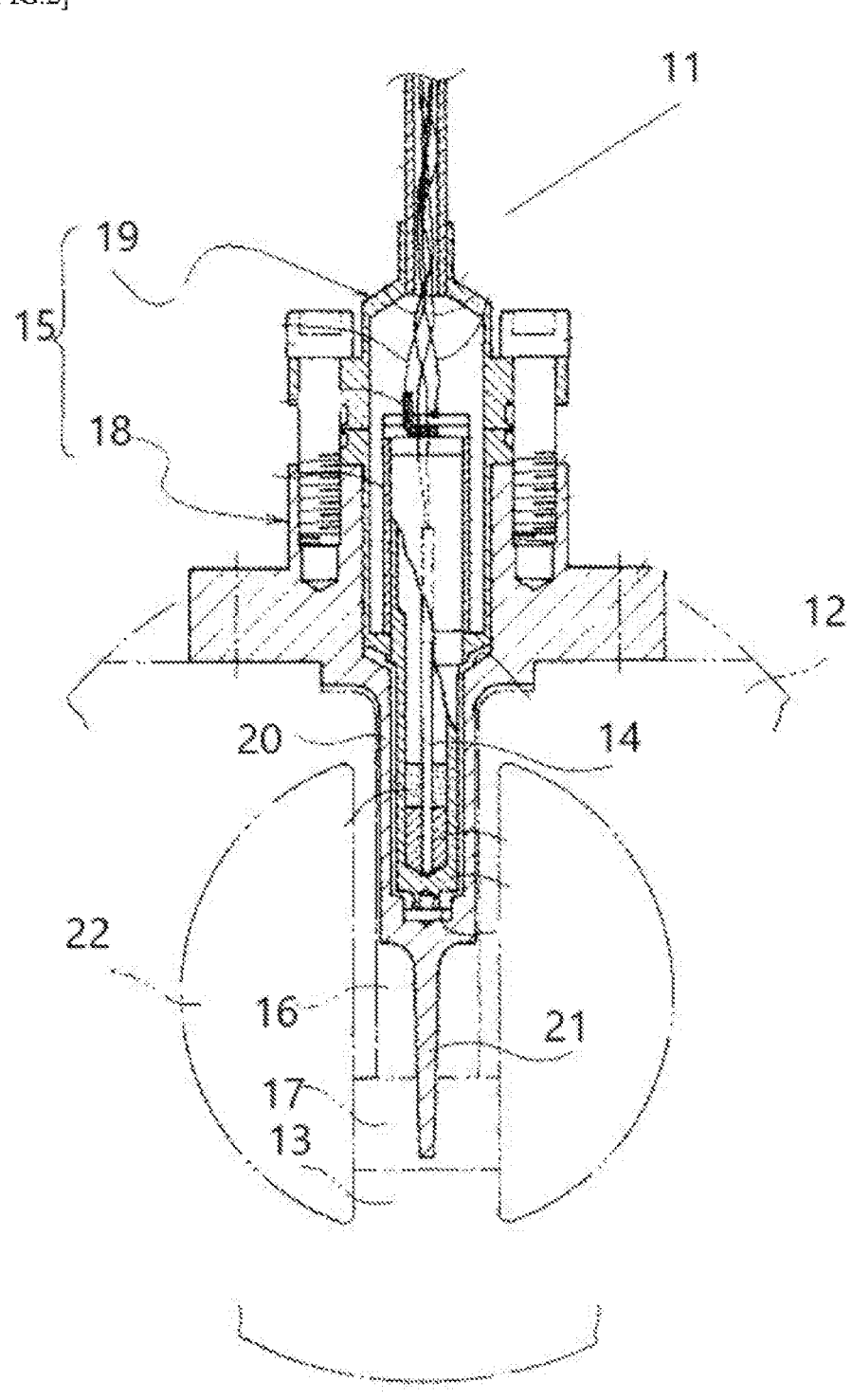

[FIG.3]
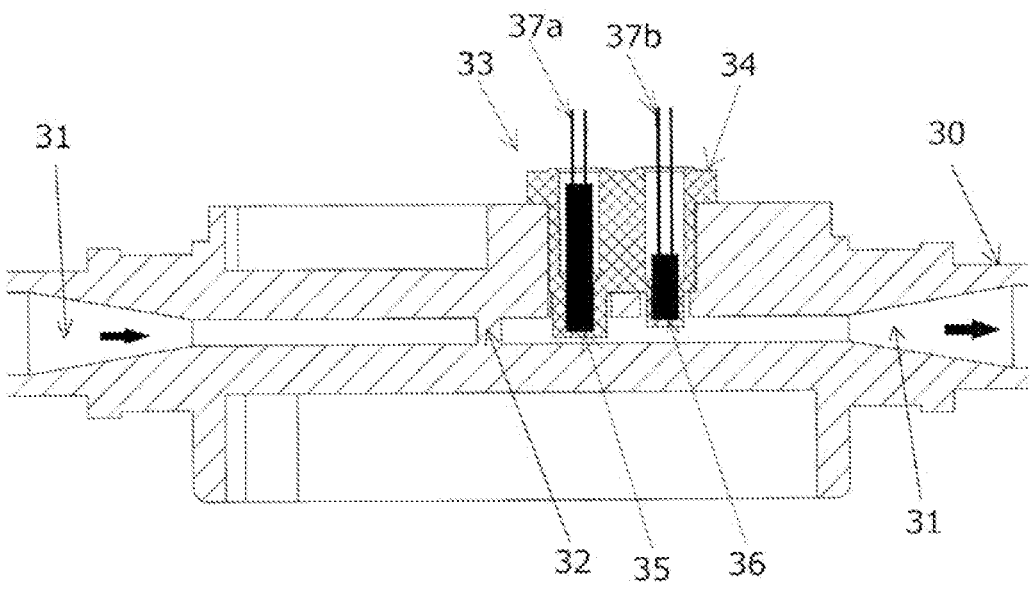

[FIG.4]

[FIG.5]
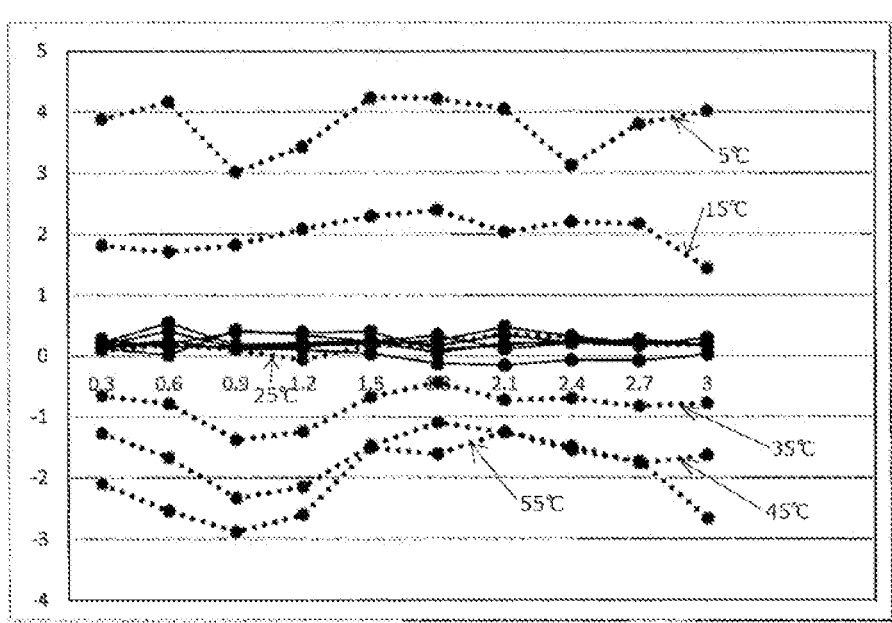

FLOW MEASUREMENT DEVICE

TECHNICAL FIELD

The present invention relates to a flow measurement device.

BACKGROUND ART

When an obstacle is placed in a flow of a fluid, a regular pattern of alternating to vortices known as a Karman vortex street is generated downstream of the obstacle. Karman vortices have been proposed to be used in a flow meter. Karman vortex flow meters have advantages of a low pressure loss, a fast response rate and a simple structure. Several sensing methods for detecting Karman vortices have already been proposed, including sensing schemes using a piezoelectric element, a strain gauge, a capacitance sensor, a shuttle piston, a thermistor or an ultrasound.

FIG. 1 shows a schematic structure of major components of a common vortex flow meter. As shown in the figure, a common vortex flow meter is composed of a bluff body 3 that generates Kannan vortices 2 in a flow 1 in a pipe, a sensing element 4 for sensing the vortices, and a transducer for processing signals detected by the sensing element 4. The bluff body 3 is placed in the flow path whose direction is perpendicular to the axis of the bluff body 3, and Karman vortices are generated downstream of the bluff body 3. The Karman vortex shedding frequency is proportional to the velocity of a flowing fluid (flow velocity), and the relation between the frequency and the flow velocity is expressed by the following equation (1):

$$f=St(v/d) \qquad (1),$$

wherein f is the vortex shedding frequency (l/sec), v is the mean flow velocity of the fluid (m/sec), d is the width of the bluff body (m), and St is a constant called the Strouhal number.

When the cross-sectional area of the flow path is S (m), the flow rate Q (m³/sec) can be calculated by the following equation (2):

$$Q=v \times S \qquad (2).$$

When v=(f×d)/St obtained from the equation (1) is substituted for v in the equation (2), the following equation (3) is obtained:

$$Q=(f \times d) \times (S/St) \qquad (3).$$

Since the width d (m) of the bluff body and the cross-sectional area S (m²) of the flow path are constant, when the Strouhal number St is a constant value and k is a constant number, the flow rate Q (m³/sec) can be expressed by the following equation (4):

$$Q=f \times k \qquad (4).$$

Hence, the flow rate Q can be determined by detecting the vortex shedding frequency f.

However, the Strouhal number varies with the Reynolds number. The Reynolds number Re is defined by the following equation (5):

$$Re = (\rho v^2)/(\mu v/D)$$
$$= v \times D/v \qquad (5)$$

wherein ρ is the density of the fluid (kg/m³). v is the mean flow velocity of the fluid (m/sec). μ is the coefficient of viscosity of the fluid (kg/m·sec), D is the width of the flow path (m), and v is the coefficient of kinematic viscosity (m²/sec).

The Reynolds number is a function of the coefficient of kinematic viscosity as shown in the equation (5). The coefficient of kinematic viscosity varies with the temperature of the fluid, and a measurement error of the flow rate may occur due to the actual temperature of the fluid. The flow rate measured using Karman vortices therefore needs to be corrected.

For example, as shown in FIG. 2, JP Patent No. 3964416 discloses a temperature sensor-integrated vortex flow meter 11. The temperature sensor-integrated vortex flow meter 11 comprises a measuring pipe 12, a bluff body 13, and a vortex detection sensor 15 having a temperature sensor 14 embedded therein. The bluff body 13 has a measuring chamber 16 having an opening at one end. The measuring chamber 16 has a pressure guide port 17 that penetrates the measuring chamber 16 in the direction perpendicular to the flow of a fluid whose flow rate is to be measured. The vortex detection sensor 15 comprises a vibrating tube 18 and a vortex sensing element 19. The vibrating tube 18 has a moving tube 20 that is inserted into the measuring chamber 16, and a pressure plate 21 coupled to an end of the moving tube 20. When the fluid flows through the flow path 22 in the measuring pipe 12, Karman vortices are generated. The pressure fluctuations due to the Karman vortices are received by the vibrating tube 18, and then converted by the vortex sensing element 19 into an electrical signal, and the electrical signal is output to a mass transducer. A temperature-based correction means in the mass transducer corrects the temperature indicated by a temperature sensor 14, and a mass flow rate is calculated based on the corrected temperature.

SUMMARY OF INVENTION

Technical Problem

The temperature sensor-integrated vortex flow meter disclosed in JP Patent No. 3964416 only has a temperature-based correction means whose specific configuration is unknown, and cannot reliably correct a measurement error of the flow rate of a fluid due to the temperature of the fluid.

The present invention was made to solve this problem in the conventional art. An object of the present invention is thus to provide a flow measurement device capable of reliably correcting a measurement error of a flow rate of a fluid due to the temperature of the fluid.

Solution to Problem

To solve the above problem, the present invention provides
a flow measurement device comprising
a bluff body inserted in a flow of a fluid,
a sensing element for sensing a change in Karman vortices generated downstream of the bluff body by converting the change into an electrical signal,
an electric circuit for converting the electrical signal into a vortex shedding frequency,
an arithmetic circuit for calculating a flow rate of the fluid based on the vortex shedding frequency, and
a temperature sensor arranged downstream of the sensing element,
wherein the arithmetic circuit has a previously determined correction table showing a relation of a temperature $t_0$, $t_1$, $t_2$, . . . , or $t_n$ ($t_0 < t_1 < t_2 < . . . < t_n$) of the fluid and the vortex shedding frequency and the flow rate:

wherein t indicates a temperature of the fluid measured with the temperature sensor, and f indicates the vortex shedding frequency converted from the electrical signal sensed with the sensing element; and wherein when both of the temperature t and the vortex shedding frequency f are found in the correction table, the flow rate corresponding to the vortex shedding frequency is output as a corrected flow rate; or wherein when the temperature t corresponds to any one of the temperatures $t_0$, $t_1$, $t_2$, . . . and $t_n$ in the correction table, but the vortex shedding frequency f is not found in the correction table, a flow rate at the vortex shedding frequency f is calculated by the arithmetic circuit and output as a corrected flow rate, assuming that the amount of vortex shedding frequency change is in a linear relation with the amount of flow rate change; or wherein when the temperature t does not correspond to any of the temperatures in the correction table, and the temperature t is in between two adjacent temperatures to and $t_\beta$ included in the temperatures $t_0$, $t_1$, $t_2$, . . . and $t_n$ in the correction table, a vortex shedding frequency at the temperature t is calculated by the arithmetic circuit, assuming that the amount of temperature change is in a linear relation with the amount of vortex shedding frequency change, and then a flow rate at the vortex shedding frequency f is calculated by the arithmetic circuit and output as a corrected flow rate, assuming that the amount of vortex shedding frequency change is in a linear relation with the amount of flow rate Q change.

FIG. 3 is a schematic structural view of an embodiment of the flow measurement device of the present invention. In this figure, the numeral 31 indicates a flow path in a measuring pipe 30, in which a fluid flows in the direction indicated by the arrow. A bluff body 32 is arranged in the flow path 31. The fluid flowing through the flow path 31 in the measuring pipe 30 comes in contact with the bluff body 32, and Karman vortices are generated downstream of the bluff body 32.

The numeral 33 indicates a Kaman vortex sensor that is arranged downstream of the bluff body 32. The Karman vortex sensor 33 comprises a cylindrical shaped element holding member 34 that has a piezoelectric element 35 (a sensing element for sensing a change in the Kannan vortices by converting the change into an electrical signal) and a temperature sensor 36 embedded therein. The numerals 37a, 37b indicate lead wires.

In the configuration as described above, the fluid flowing through the measuring pipe 30 comes in contact with the bluff body 32, and Karman vortices are generated downstream of the bluff body 32. The element holding member 34 vibrates in response to the Karman vortices, and the vibration is sensed by the piezoelectric element 35 and converted into an electrical signal. If the temperature sensor is arranged upstream of the bluff body 32, the temperature sensor becomes an obstacle upstream of the bluff body 32 and may affect the generation of the vortices. Accordingly, the temperature sensor 36 is arranged downstream of the piezoelectric element 35. The flow rate of the fluid can be corrected based on the amount of vortex shedding frequency change depending on the temperature of the fluid measured with the temperature sensor 36.

The fluid whose flow rate is to be measured may be a corrosive liquid reagent that is used as a cleaning liquid for industrial devices. When the fluid whose flow rate is to be measured is a corrosive liquid reagent, the flow measurement device should be made of a material that resists the corrosive liquid reagent. In this case, the temperature sensor 36 is preferably protected by a chemical-resistant material (a material that resists the corrosive liquid reagent). More preferably, the material that forms the flow path 31 through which the fluid flows, the bluff body 32 for generating Karman vortices and the piezoelectric element 35 are protected by a chemical-resistant material. The chemical-resistant material is preferably a fluororesin, which has good acid and alkali resistance and good organic solvent resistance, such as PFA (perfluoroalkoxyalkane) and PTFE (polytetrafluoroethylene). The bluff body 32 in this embodiment of the present invention is made of PFA.

The coefficient of linear expansion of the material that forms the flow path is preferably small to reduce changes in the cross-sectional area of the flow path. PFA and PTFE have a coefficient of linear expansion of $12.4 \times 10^{-5}/°$ C. at about 20 to 100° C. Borosilicate glass, which has good acid and alkali resistance, has a coefficient of linear expansion of $3.2 \times 10^{-6}/°$ C. at 0 to 350° C., which is smaller than that of PFA or PTFE by one or more orders of magnitude, and is more preferred as a material that forms the flow path. Quartz also has good acid and alkali resistance, and has a coefficient of linear expansion of $0.52 \times 10^{-6}/°$ C. at 0 to 100° C., which is smaller than that of PFA or PTFE by two or more orders of magnitude, and is further more preferred as a material that forms the flow path.

Even when the materials that form components other than the flow path, i.e., the temperature sensor 36 and the piezoelectric element 35, are protected by PFA or PTFE, a measurement error due to changes in the cross-sectional area by a temperature rise does not occur. Accordingly, when the fluid to be measured is a corrosive liquid reagent, the temperature sensor 36 and the piezoelectric element 35 are preferably coated with PFA or PTFE. PFA or PTFE is more preferably mixed with about 20 to 25% by weight of a filler, such as glass fiber or carbon graphite, to reduce the coefficient of linear expansion of PFA or PTFE by about 20 to 40%. The element holding member 34 and the measuring pipe 30 in this embodiment are made of PFA.

Advantageous Effects of Invention

The flow measurement device of the present invention comprises an obstacle inserted in a flow of a fluid to generate Kannan vortices downstream of the obstacle, and a temperature sensor arranged downstream of a sensing element for sensing a change in the Karman vortices by converting the change into an electrical signal, wherein the flow measurement device is capable of reliably correcting the flow rate of the fluid based on the amount of vortex shedding frequency change depending on the temperature of the fluid measured with the temperature sensor.

BRIEF DESCRIPTION OF DRAWINGS

FIG. 1 is a schematic structural view of major components of a common vortex flow meter.

FIG. 2 is a schematic sectional view of a conventional vortex flow meter.

FIG. 3 is a schematic structural view of an embodiment of a flow measurement device of the present invention.

FIG. 4 is a schematic block configuration diagram of an electric circuit containing a CPU with an arithmetic circuit in the flow measurement device of the present invention.

FIG. 5 is a chart showing the accuracy of flow rates measured with the flow measurement device of the present invention, comparing the case where the flow rates are corrected based on the temperature of the fluid and the case where the flow rates are not corrected.

DESCRIPTION OF EMBODIMENTS

The present invention will be described in detail below based on various embodiments. The embodiments described below are provided for illustration purposes only, and the present invention is not limited thereto. Various alterations and modifications are possible within the technical scope of the present invention.

The flow measurement device of the present invention comprises a temperature sensor arranged downstream of a piezoelectric element for sensing a change in Karman vortices by converting the change into an electrical signal, wherein the flow rate of a fluid is corrected based on the amount of vortex shedding frequency change depending on the temperature of the fluid measured with the temperature sensor. The correction procedure will be specifically described in detail below.

Figure 4:
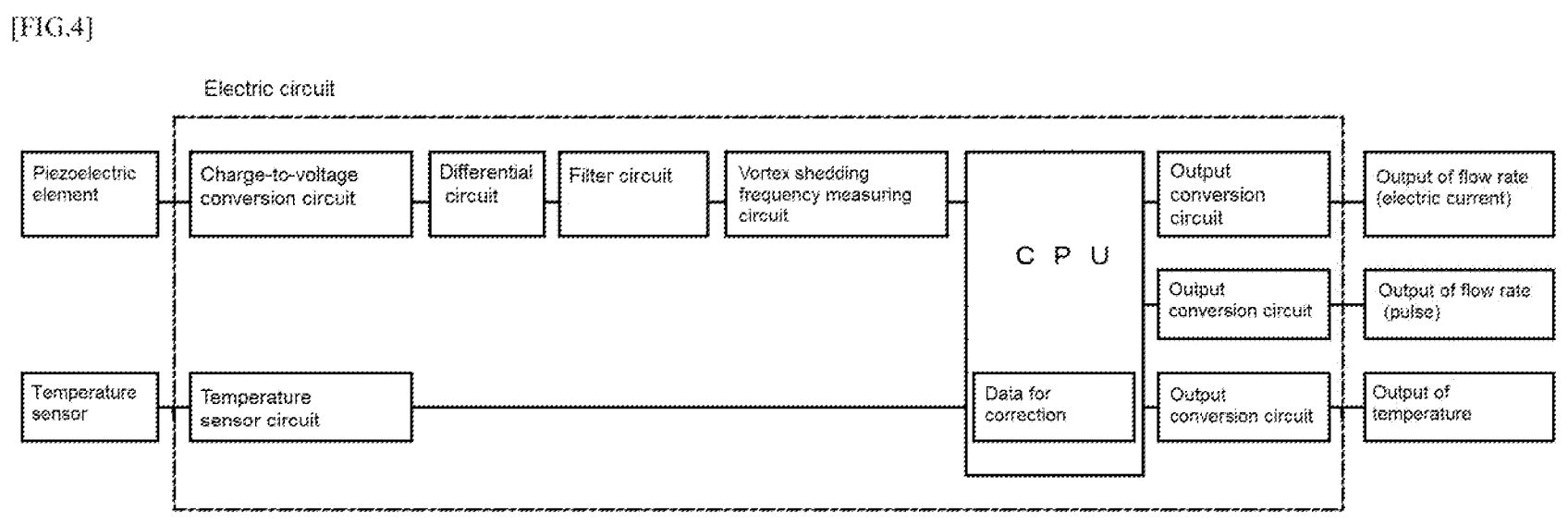

In the flow measurement device as shown in FIG. 3, a fluid flowing through the flow path 31 in the measuring pipe 30 comes in contact with the bluff body 32 to generate Karman vortices downstream of the bluff body 32. The vibration caused by the Karman vortices is converted into an electrical signal by the piezoelectric element 35 embedded in the element holding member 34 of the Kannan vortex sensor 33 arranged downstream of the bluff body 32. The electrical signal is transmitted, via the lead wires 37a, to a charge-to-voltage conversion circuit, a differential circuit, a filter circuit, a vortex shedding frequency measuring circuit and a CPU in the electric circuit surrounded by the dot-dashed line in FIG. 4. Meanwhile, the temperature data measured with the temperature sensor 36 arranged downstream of the piezoelectric element 35 embedded in the element holding member 34 of the Karman vortex sensor 33 are transmitted, via the lead wires 37b, to a temperature sensor circuit and the CPU in the electric circuit surrounded by the dot-dashed line in FIG. 4. The flow rate value is calculated in an arithmetic circuit in the CPU based on the vortex shedding frequency converted from the electrical signal obtained from the piezoelectric element 35. Temperature-based correction of the flow rate value is performed based on data for correction stored in a correction table that is saved in the CPU and defines the amount of vortex shedding frequency change of the fluid depending on the temperature of the fluid. The corrected flow value is then output as a pulse and an electric current.

Table 1 shows the vortex shedding frequency (l/sec), wherein the flow rate of water as a fluid flowing through the flow measurement device is expressed as a percentage from to 100%, taking the maximum flow rate value (3 liter/min) as 100%, when the temperature of the water is varied as follows: 5° C. 15° C., 25° C., 35° C. 45° C. or 55° C.

TABLE 1

| Flow rate | | Fluid temperature | | | | | |
|---|---|---|---|---|---|---|---|
| (liter/min) | (% FS) | 5° C. | 15° C. | 25° C. | 35° C. | 45° C. | 55 ℃. |
| 0.3 | 10 | 252.5 | 230.6 | 215.1 | 207.1 | 199.2 | 192.3 |
| 0.6 | 20 | 322.3 | 299.8 | 284.4 | 276.4 | 268.8 | 262.3 |
| 0.9 | 30 | 392.0 | 369.0 | 353.7 | 345.7 | 338.4 | 332.2 |

TABLE 1-continued

| Flow rate | | Fluid temperature | | | | | |
|---|---|---|---|---|---|---|---|
| (liter/min) | (% FS) | 5° C. | 15° C. | 25° C. | 35° C. | 45° C. | 55 ℃. |
| 1.2 | 40 | 461.8 | 438.3 | 423.0 | 415.0 | 408 | 402.2 |
| 1.5 | 50 | 531.6 | 507.5 | 492.4 | 484.3 | 477.6 | 472.2 |
| 1.8 | 60 | 601.3 | 576.7 | 561.7 | 553.5 | 547.3 | 542.1 |
| 2.1 | 70 | 671.1 | 646.0 | 631.0 | 622.8 | 616.9 | 612.1 |
| 2.4 | 80 | 740.8 | 715.2 | 700.4 | 692.1 | 686.5 | 682.1 |
| 2.7 | 90 | 810.6 | 784.4 | 769.7 | 761.4 | 756.1 | 752.0 |
| 3.0 | 100 | 880.4 | 853.7 | 839 | 830.7 | 825.7 | 822.0 |

As shown in Table 1, when the flow rate is 100%, the vortex shedding frequency varies from 839.0 at 25° C. to 880.4 at 5° C. Even when the actual flow rate flowing through the flow measurement device is kept constant, the vortex shedding frequency varies with the temperature of the fluid, resulting in the difference of the output flow rate calculated from the vortex shedding frequency. The vortex shedding frequency generated by the Karman vortices largely depends on the shape of the bluff body and the geometry of the flow path. The rate of change in the vortex shedding frequency can be made constant in individual flow measurement device products by stabilizing the shape of the bluff body and the geometry of the flow path by molding process. Consequently, the data of the vortex shedding frequency, which varies with the change in the fluid temperature, does not need to be collected for individual flow measurement device products, but instead, representative frequency values can be stored in all the flow measurement device products to correct the flow rate. The coefficient of viscosity varies with the type of fluid, and the data showing the changes in the vortex shedding frequency, such as shown in Table 1 above, can be prepared for various types of fluid, in addition to water. By using such data and the temperature information of the fluid obtained from the temperature sensor, the flow rate of the fluid can be corrected.

A table showing the changes in the vortex shedding frequency depending on the changes in the temperature of a fluid, such as shown in Table 1, is obtained by experiments using individual flow measurement device products. The mean values from the table are normalized such that the vortex shedding frequency at a flow rate of 100% at 25° C. is 1.0000 to obtain Table 2 below. Table 2 is used as a basic table and saved in the storage of the CPU shown in FIG. 4.

TABLE 2

| Flow rate | | Fluid temperature | | | | | |
|---|---|---|---|---|---|---|---|
| (liter/min) | (% FS) | 5° C. | 15° C. | 25° C. | 35° C. | 45° C. | 55° C. |
| 0.3 | 10 | 0.3010 | 0.2749 | 0.2564 | 0.2468 | 0.2374 | 0.2292 |
| 0.6 | 20 | 0.3841 | 0.3573 | 0.3390 | 0.3294 | 0.3204 | 0.3126 |
| 0.9 | 30 | 0.4672 | 0.4398 | 0.4216 | 0.4120 | 0.4033 | 0.3959 |
| 1.2 | 40 | 0.5504 | 0.5224 | 0.5042 | 0.4946 | 0.4863 | 0.4794 |
| 1.5 | 50 | 0.6336 | 0.6049 | 0.5869 | 0.5772 | 0.5692 | 0.5628 |
| 1.8 | 60 | 0.7167 | 0.6874 | 0.6695 | 0.6597 | 0.6523 | 0.6461 |
| 2.1 | 70 | 0.7999 | 0.770 | 0.7521 | 0.7423 | 0.7353 | 0.7296 |
| 2.4 | 80 | 0.8830 | 0.8524 | 0.8348 | 0.8249 | 0.8182 | 0.8130 |
| 2.7 | 90 | 0.9662 | 0.9349 | 0.9174 | 0.9075 | 0.9012 | 0.8963 |
| 3.0 | 100 | 1.0493 | 1.0175 | 1.0000 | 0.9901 | 0.9841 | 0.9797 |

The vortex shedding frequency of the individual flow measurement device products is measured at a flow rate of 100% oat 25° C., and is then multiplied with the value in Table 2 at the corresponding flow rate at the corresponding temperature. For example, when the vortex shedding frequency of a flow measurement device product as measured at a flow rate of 100% f at 25° C. is 850 l/sec, the value 850 is then multiplied with the value in Table2 at the corresponding flow rate at the corresponding temperature. This procedure is repeated by varying the flow rate and the temperature to produce Table 3. Table 3 serves as a correction table for an individual product, and saved in the arithmetic circuit of the CPU as shown in FIG. 4.

TABLE 3

| Flow rate | | Fluid temperature | | | | | |
|---|---|---|---|---|---|---|---|
| (liter/min) | (% FS) | 5° C. | 15° C. | 25° C. | 35° C. | 45° C. | 55° C. |
| 0.3 | 10 | 255.8 | 233.6 | 217.9 | 209.8 | 201.8 | 194.8 |
| 0.6 | 20 | 326.5 | 303.7 | 288.1 | 280.0 | 272.8 | 265.7 |
| 0.9 | 30 | 397.1 | 373.8 | 358.3 | 350.2 | 342.8 | 336.6 |
| 1.2 | 40 | 467.9 | 444.0 | 428.5 | 420.4 | 413.3 | 407.5 |
| 1.5 | 50 | 538.6 | 514.2 | 498.9 | 490.6 | 483.9 | 478.4 |
| 1.8 | 60 | 609.2 | 584.3 | 569.1 | 560.8 | 554.5 | 549.2 |
| 2.1 | 70 | 679.9 | 654.5 | 639.3 | 631.0 | 625.0 | 620.1 |
| 2.4 | 80 | 750.5 | 724.6 | 709.6 | 701.2 | 695.5 | 691.0 |
| 2.7 | 90 | 821.2 | 794.7 | 779.8 | 771.4 | 766.0 | 761.9 |
| 3.0 | 100 | 891.9 | 864.9 | 850.0 | 841.6 | 836.5 | 832.8 |

The flow rate of the fluid is corrected based on the temperature of the fluid measured with the temperature sensor 36 at the time of measuring the flow rate of the fluid and based on the vortex shedding frequency converted from the electrical signal detected by the piezoelectric element 35. Specific procedure for correcting the flow rate of the fluid will be described in detail below.

(1) When the temperature of the fluid measured with the temperature sensor 36 is 15° C. and the vortex shedding frequency converted from the electrical signal detected by the piezoelectric element 35 is 724.6 l/sec, the temperature value and the vortex shedding to frequency can be found in Table 3. Accordingly, the flow rate corresponding to the temperature of 15° C. and the vortex shedding frequency of 724.6 l/sec in Table 3 is determined as a corrected flow rate, which is in this case 2.4 liter/min, and is then output from the CPU shown in FIG. 4.

(2) When the temperature of the fluid measured with the temperature sensor 36 is 25° C. and the vortex shedding frequency converted from the electrical signal detected by the piezoelectric element 35 is 440 l/sec, the cell corresponding to both of the temperature value of 25° C. and the vortex shedding frequency of 440 l/sec cannot be found in Table 3. According to Table 3, the flow rate at a vortex shedding frequency of 428.5 l/sec at a temperature of 25° C. is 1.2 liter/min, and the flow rate at a vortex shedding frequency of 498.9 l/sec at a temperature of 25° C. is 1.5 liter/min. Considering these specific values in Table 3, the amount of vortex shedding frequency change is assumed to be in a linear relation with the amount of flow rate change. Accordingly, the corrected flow rate at a vortex shedding frequency of 440 l/sec at 25° C. can be determined as follows:

$$1.2(liter/min)+(1.5-1.2)\times(440-428.5)/(498.9-428.5)=$$
$$1.249(liter/min)$$

This equation is calculated by the arithmetic circuit of the CPU in FIG. 4, and the corrected flow rate is determined to be 1.249 liter/min from the temperature of 25° C. and the vortex shedding frequency of 440 l/sec and is then output from the CPU shown in FIG. 4.

(3) When the temperature of the fluid measured with the temperature sensor 36 is 12° C. and the vortex shedding frequency converted from the electrical signal detected by the piezoelectric element 35 is 600 l/sec, the cell corresponding to both of the temperature value of 12° C. and the vortex shedding frequency of 600 l/sec cannot be found in Table 3. According to Table 3, the vortex shedding frequency at a flow rate of 0.3 liter/min and a temperature of 5° C. is 255.8 l/sec, and the vortex shedding frequency at a flow rate of 0.3 liter/min and a temperature of 15° C. is 233.6 l/sec. Considering these specific values in Table 3, the amount of temperature change is assumed to be in a linear relation with the amount of vortex shedding frequency change. Accordingly, the vortex shedding frequency (l/sec) at a flow rate of 0.3 liter/min at 12° C. can be determined as follows:

$$233.6+(255.8-233.6)\times(15-12)/(15-5)=240.3$$

The vortex shedding frequency (l/sec) at 12° C.; at a flow rate of 0.6, 0.9, 1.2, 1.5, 1.8, 2.1, 2.4, 2.7 or 3.0 liter/min can be determined in the same manner as above.

This equation is calculated by the arithmetic circuit of the CPU in FIG. 4 and saved in the storage of the CPU.

Table 4 shows the vortex shedding frequency (l/sec) when the temperature saved in the storage of the CPU is 12° C. and the flow rate is 0.3 to 3.0 liter/min.

TABLE 4

| Flow rate | | Fluid temperature |
|---|---|---|
| (liter/min) | (% FS) | 12° C. |
| 0.3 | 10 | 240.3 |
| 0.6 | 20 | 310.6 |
| 0.9 | 30 | 380.8 |
| 1.2 | 40 | 451.2 |
| 1.5 | 50 | 521.5 |
| 1.8 | 60 | 591.7 |
| 2.1 | 70 | 662.1 |
| 2.4 | 80 | 732.4 |
| 2.7 | 90 | 802.6 |
| 3.0 | 100 | 873.0 |

According to Table 4, the flow rate at a vortex shedding frequency of 591.7 l/sec at a temperature of 12° C. is 1.8 liter/min, and the flow rate at a vortex shedding frequency of 662.1 l/sec at a temperature of 12° C. is 2.1 liter/min. Considering these specific values in Table 3, the amount of vortex shedding frequency change is assumed to be in a linear relation with the amount of flow rate change. Accordingly, the corrected flow rate at a vortex shedding frequency of 600 l/sec at 12° C. can be determined as follows:

$$1.8(liter/min)+(2.1-1.8)\times(600-591.7)/(662.1-591.7)=$$
$$1.835(liter/min)$$

This equation is calculated by the arithmetic circuit of the CPU in FIG. 4, and the corrected flow rate is determined to be 1.835 liter/in from the temperature of 12° C. and the vortex shedding frequency of 600 l/sec and is then output from the CPU shown in FIG. 4.

TABLE 5

| Fluid temperature (° C.) | Reference flow rate | | Output from flow measurement device | | | |
|---|---|---|---|---|---|---|
| | | | No temperature-based correction | | Temperature-based correction | |
| | | | Flow rate | Accuracy | Flow rate | Accuracy |
| | (liter/min) | (% FS) | (liter/min) | (%/FS) | (liter/min) | (%/FS) |
| 5 | 0.3 | 10 | 0.416 | 3.88 | 0.305 | 0.17 |
| | 0.6 | 20 | 0.725 | 4.16 | 0.608 | 0.25 |
| | 0.9 | 30 | 0.991 | 3.02 | 0.903 | 0.11 |
| | 1.2 | 40 | 1.303 | 3.43 | 1.203 | 0.11 |
| | 1.5 | 50 | 1.627 | 4.23 | 1.501 | 0.04 |
| | 1.8 | 60 | 1.927 | 4.22 | 1.796 | −0.12 |
| | 2.1 | 70 | 2.222 | 4.05 | 2.095 | −0.15 |
| | 2.4 | 80 | 2.494 | 3.13 | 2.398 | −0.06 |
| | 2.7 | 90 | 2.814 | 3.81 | 2.698 | −0.07 |
| | 3.0 | 100 | 3.121 | 4.02 | 3.001 | 0.03 |

TABLE 6

| Fluid temperature (° C.) | Reference flow rate | | Output from flow measurement device | | | |
|---|---|---|---|---|---|---|
| | | | No temperature-based correction | | Temperature-based correction | |
| | | | Flow rate | Accuracy | Flow rate | Accuracy |
| | (liter/min) | (% FS) | (liter/min) | (%/FS) | (liter/min) | (%/FS) |
| 15 | 0.3 | 10 | 0.354 | 1.81 | 0.304 | 0.13 |
| | 0.6 | 20 | 0.651 | 1.71 | 0.601 | 0.02 |
| | 0.9 | 30 | 0.995 | 1.82 | 0.913 | 0.43 |
| | 1.2 | 40 | 1.262 | 2.08 | 1.211 | 0.35 |
| | 1.5 | 50 | 1.569 | 2.30 | 1.507 | 0.24 |
| | 1.8 | 60 | 1.872 | 2.40 | 1.802 | 0.06 |
| | 2.1 | 70 | 2.161 | 2.04 | 2.106 | 0.21 |
| | 2.4 | 80 | 2.466 | 2.21 | 2.407 | 0.22 |
| | 2.7 | 90 | 2.765 | 2.17 | 2.705 | 0.18 |
| | 3.0 | 100 | 3.043 | 1.44 | 3.009 | 0.30 |

40

TABLE 7

| Fluid temperature (° C.) | Reference flow rate | | Output from flow measurement device | | | |
|---|---|---|---|---|---|---|
| | | | No temperature-based correction | | Temperature-based correction | |
| | | | Flow rate | Accuracy | Flow rate | Accuracy |
| | (liter/min) | (% FS) | (liter/min) | (%/FS) | (liter/min) | (%/FS) |
| 25 | 0.3 | 10 | 0.303 | 0.09 | 0.308 | 0.28 |
| | 0.6 | 20 | 0.606 | 0.20 | 0.605 | 0.15 |
| | 0.9 | 30 | 0.903 | 0.10 | 0.905 | 0.17 |
| | 1.2 | 40 | 1.198 | −0.06 | 1.206 | 0.18 |
| | 1.5 | 50 | 1.505 | 0.18 | 1.506 | 0.20 |
| | 1.8 | 60 | 1.805 | 0.17 | 1.808 | 0.26 |
| | 2.1 | 70 | 2.111 | 0.38 | 2.114 | 0.48 |
| | 2.4 | 80 | 2.409 | 0.31 | 2.410 | 0.33 |
| | 2.7 | 90 | 2.706 | 0.19 | 2.706 | 0.21 |
| | 3.0 | 100 | 3.006 | 0.20 | 3.006 | 0.19 |

TABLE 8

| Fluid temperature (° C.) | Reference flow rate | | Output from flow measurement device | | | |
|---|---|---|---|---|---|---|
| | | | No temperature-based correction | | Temperature-based correction | |
| | | | Flow rate | Accuracy | Flow rate | Accuracy |
| | (liter/min) | (% FS) | (liter/min) | (%/FS) | (liter/min) | (%/FS) |
| 35 | 0.3 | 10 | 0.280 | −0.65 | 0.306 | 0.20 |
| | 0.6 | 20 | 0.577 | −0.78 | 0.612 | 0.41 |
| | 0.9 | 30 | 0.859 | −1.38 | 0.904 | 0.14 |
| | 1.2 | 40 | 1.163 | −1.24 | 1.205 | 0.15 |
| | 1.5 | 50 | 1.480 | −0.67 | 1.508 | 0.26 |
| | 1.8 | 60 | 1.787 | −0.43 | 1.805 | 0.18 |
| | 2.1 | 70 | 2.079 | −0.72 | 2.110 | 0.35 |
| | 2.4 | 80 | 2.379 | −0.69 | 2.407 | 0.23 |
| | 2.7 | 90 | 2.675 | −0.82 | 2.708 | 0.28 |
| | 3.0 | 100 | 2.977 | −0.77 | 3.006 | 0.19 |

TABLE 9

| Fluid temperature (° C.) | Reference flow rate | | Output from flow measurement device | | | |
|---|---|---|---|---|---|---|
| | | | No temperature-based correction | | Temperature-based correction | |
| | | | Flow rate | Accuracy | Flow rate | Accuracy |
| | (liter/min) | (% FS) | (liter/min) | (%/FS) | (liter/min) | (%/FS) |
| 45 | 0.3 | 10 | 0.262 | −1.27 | 0.307 | 0.22 |
| | 0.6 | 20 | 0.550 | −1.67 | 0.616 | 0.55 |
| | 0.9 | 30 | 0.830 | −2.33 | 0.905 | 0.18 |
| | 1.2 | 40 | 1.135 | −2.15 | 1.207 | 0.22 |
| | 1.5 | 50 | 1.456 | −1.47 | 1.507 | 0.25 |
| | 1.8 | 60 | 1.767 | −1.09 | 1.810 | 0.34 |
| | 2.1 | 70 | 2.062 | −1.25 | 2.104 | 0.12 |
| | 2.4 | 80 | 2.356 | −1.48 | 2.407 | 0.22 |
| | 2.7 | 90 | 2.647 | −1.76 | 2.707 | 0.24 |
| | 3.0 | 100 | 2.951 | −1.63 | 3.006 | 0.20 |

40

TABLE 10

| Fluid temperature (° C.) | Reference flow rate | | Output from flow measurement device | | | |
|---|---|---|---|---|---|---|
| | | | No temperature-based correction | | Temperature-based correction | |
| | | | Flow rate | Accuracy | Flow rate | Accuracy |
| | (liter/min) | (% FS) | (liter/min) | (%/FS) | (liter/min) | (%/FS) |
| 55 | 0.3 | 10 | 0.237 | −2.10 | 0.304 | 0.13 |
| | 0.6 | 20 | 0.524 | −2.53 | 0.606 | 0.20 |
| | 0.9 | 30 | 0.814 | −2.87 | 0.912 | 0.40 |
| | 1.2 | 40 | 1.122 | −2.60 | 1.212 | 0.40 |
| | 1.5 | 50 | 1.455 | −1.50 | 1.512 | 0.40 |
| | 1.8 | 60 | 1.752 | −1.60 | 1.804 | 0.13 |
| | 2.1 | 70 | 2.063 | −1.23 | 2.105 | 0.17 |
| | 2.4 | 80 | 2.354 | −1.53 | 2.408 | 0.27 |
| | 2.7 | 90 | 2.648 | −1.73 | 2.707 | 0.23 |
| | 3.0 | 100 | 2.920 | −2.66 | 3.005 | 0.17 |

Tables 5 to 10 show the accuracy of the output flow rates from the flow measurement device as determined by fixing the temperature and the flow rate of a fluid (water) using a measurement standard. The accuracy of the determined output flow rates was compared between the case where the output flow rates were corrected based on the temperature of the fluid and the case where the output flow rates were not corrected. As shown in the tables, the values representing the accuracy when the output flow rates were corrected based on the temperature of the fluid were considerably smaller than those when the output flow rates were not corrected. FIG. 5 is a chart showing the accuracy when the output flow rates were not corrected (dotted lines) and the accuracy when the output flow rates were corrected based on the temperature of the fluid (solid lines). The numeral values indicate the temperature of the fluid. As apparent from FIG. 5, the accuracy is improved by correction based on the temperature of the fluid, indicating that the flow measurement device of the present invention is capable of measuring the flow rate of a fluid with a high accuracy regardless of the actual temperature of the fluid.

The term "accuracy" in Tables 5 to 10 has the meaning as described below. For example, in Table 10, when the reference flow rate is 0.3 liter/min, the output flow rate that is not corrected is 0.237 liter/min, and the difference between the output flow rate and the reference flow rate is −0.063 liter/min. The ratio of the difference to the full scale (FS) 3.0 liter/min (−0.063/3.0) is −2.10%. The resulting value −2.10% represents the accuracy as shown in Table 10. As another example, in Table 10, when the reference flow rate is 0.3 liter/min, the output flow rate that is corrected based on the temperature of the fluid is 0.304 liter/min, and the difference between the output flow rate and the reference flow rate is 0.004 liter/min. The ratio of the difference to the full scale (FS) 3.0 liter/min (0.004/3.0) is 0.13%. The resulting value 0.13% represents the accuracy as shown in Table 10.

The type of fluid that a user may use will vary, and the user may use a fluid that is different from the fluid as the target of the correction table that has previously been incorporated in the flow measurement device. Accordingly, in another embodiment, the flow measurement device preferably has a means for allowing a user to correct a flow rate on their own. Specifically, the flow measurement device preferably has a function to allow a user who has purchased the flow measurement device to correct a flow rate of a fluid at an actual measurement temperature based on a relation of the actual temperature of the fluid that has been measured and a flow rate Q1 of the fluid measured at a reference temperature and a flow rate Q2 of the fluid measured at a temperature different from the reference temperature.

INDUSTRIAL APPLICABILITY

The flow measurement device of the present invention is capable of reliably correcting a measurement error of a flow rate of a fluid due to the temperature of the fluid as described above, and is useful in various industrial fields in which flow measurement is required.

REFERENCE SIGNS LIST

30 Measuring pipe
31 Flow path
32 Bluff body
33 Kannan vortex sensor
34 Element holding member
35 Piezoelectric element
36 Temperature sensor
37a, 37b Lead wires

The invention claimed is:

1. A flow measurement device comprising:
a measuring pipe made of perfluoroalkoxy alkane (PFA);
a bluff body made of PFA, arranged in the measuring pipe, and configured to be arranged in a flow of a fluid;
a rod-shaped piezoelectric element for sensing a change in Karman vortices generated downstream of the bluff body by converting the change into an electrical signal;
an electric circuit for converting the electrical signal into a vortex shedding frequency;
an arithmetic circuit for calculating a flow rate of the fluid based on the vortex shedding frequency;
a temperature sensor; and
an element holding member made of PFA,
wherein:
the measuring pipe and the bluff body are integrally formed;
the temperature sensor is arranged downstream of the rod-shaped piezoelectric element;
the rod-shaped piezoelectric element and the temperature sensor are embedded in the element holding member;
the arithmetic circuit has a previously determined correction table showing a relation of a temperature $t_0$, $t_1$, $t_2$, . . . , or $t_n$ ($t_0 < t_1 < t_2 < . . . < t_n$) of the fluid and the vortex shedding frequency and the flow rate of the fluid;
t indicates a temperature of the fluid measured with the temperature sensor, and f indicates the vortex shedding frequency converted from the electrical signal sensed with the rod-shaped piezoelectric element; and
when both of the temperature t and the vortex shedding frequency f are found in the previously determined correction table, the flow rate of the fluid corresponding to the vortex shedding frequency is output as a corrected flow rate; or
when the temperature t corresponds to any one of the temperatures $t_0$, $t_1$, $t_2$, . . . , and $t_n$ in the previously determined correction table, but the vortex shedding frequency f is not found in the previously determined correction table, the flow rate of the fluid corresponding to the vortex shedding frequency f is calculated by the arithmetic circuit and output as the corrected flow rate, assuming that an amount of vortex shedding frequency change is in a linear relation with an amount of flow rate change; or
when the temperature t does not correspond to any of the temperatures $t_0$, $t_1$, $t_2$, . . . , and $t_n$ in the previously determined correction table, and the temperature t is in between two adjacent temperatures $t_\alpha$ and $t_\beta$ included in the temperatures $t_0$, $t_1$, $t_2$, . . . , and $t_n$ in the previously determined correction table, the vortex shedding frequency f at the temperature t is calculated by the arithmetic circuit, assuming that an amount of temperature change is in a linear relation with the amount of vortex shedding frequency change, and then the flow rate of the fluid corresponding to the vortex shedding frequency f is calculated by the arithmetic circuit and output as a corrected flow rate, assuming that the amount of vortex shedding frequency change is in the linear relation with the amount of flow rate change.

* * * * *